United States Patent
Dolan et al.

(10) Patent No.: US 11,174,737 B2
(45) Date of Patent: Nov. 16, 2021

(54) AIRFOIL WITH COVER FOR GAS TURBINE ENGINE

(71) Applicant: United Technologies Corporation, Farmington, CT (US)

(72) Inventors: Robert C. Dolan, Coventry, CT (US);
Michael A. Weisse, Tolland, CT (US);
Daniel A. Bales, Avon, CT (US);
Steven T. Gordon, Glastonbury, CT (US); Dmitri Novikov, Avon, CT (US);
Eric W. Malmborg, Amston, CT (US);
Francis B. Parisi, West Suffield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/828,056

(22) Filed: Mar. 24, 2020

(65) Prior Publication Data
US 2020/0392854 A1 Dec. 17, 2020

Related U.S. Application Data

(60) Provisional application No. 62/860,443, filed on Jun. 12, 2019.

(51) Int. Cl.
*F01D 5/00* (2006.01)
*F01D 5/18* (2006.01)

(52) U.S. Cl.
CPC ........ *F01D 5/187* (2013.01); *F05D 2220/323* (2013.01); *F05D 2260/201* (2013.01)

(58) Field of Classification Search
CPC . F01D 5/187; F01D 5/16; F01D 5/147; F05D 2220/323; F05D 2220/36;
(Continued)

(56) References Cited

U.S. PATENT DOCUMENTS

| 2,675,208 | A | 4/1954 | Weinberg |
| 4,188,811 | A | 2/1980 | Brimm |

(Continued)

FOREIGN PATENT DOCUMENTS

| CN | 101418811 | 4/2009 |
| DE | 102011076082 | 11/2012 |

(Continued)

OTHER PUBLICATIONS

European Search Report for European Patent Application No. 20179030.0 completed Oct. 6, 2020.

*Primary Examiner* — Phutthiwat Wongwian
*Assistant Examiner* — Sherman D Manley
(74) *Attorney, Agent, or Firm* — Carlson, Gaskey & Olds, P.C.

(57) ABSTRACT

An airfoil for a gas turbine engine according to an example of the present disclosure includes, among other things, an airfoil body defining a recessed region and including at least one rib dimensioned to loop about a respective pocket within a perimeter of the recessed region. At least one cover skin is welded to the airfoil body along the at least one rib to enclose the recessed region. The at least one cover skin is welded to the at least one rib along a respective weld path. The weld path defines a weld width, the at least one rib defines a rib width, and a ratio of the weld width to the rib width is equal to or greater than 3:1 for each position along the weld path. A method of forming a gas turbine engine component is also disclosed.

20 Claims, 12 Drawing Sheets

(58) Field of Classification Search
CPC ......... F05D 2260/201; F05D 2230/232; Y02T 50/60; B23K 2101/045; B23K 2101/001; B23K 20/233; B23K 20/129; B23K 20/2336; B23K 20/1265; B23K 2103/10; B23K 2103/14; B23P 15/04
See application file for complete search history.

(56) References Cited

U.S. PATENT DOCUMENTS

| | | |
|---|---|---|
| 5,063,662 A | 11/1991 | Porter et al. |
| 5,269,058 A | 12/1993 | Wiggs et al. |
| 6,039,542 A | 3/2000 | Schilling et al. |
| 6,994,524 B2 | 2/2006 | Owen et al. |
| 6,994,525 B2 | 2/2006 | Weisse et al. |
| 7,021,899 B2 | 4/2006 | Ferte et al. |
| 7,070,391 B2 | 7/2006 | Weisse |
| 7,189,064 B2 | 3/2007 | Helder et al. |
| 7,237,709 B2 | 7/2007 | Beckford |
| 7,296,977 B2 | 11/2007 | Bonnet |
| 7,322,223 B2 | 1/2008 | Levers |
| 7,458,780 B2 | 12/2008 | Weisse et al. |
| 7,753,654 B2 | 7/2010 | Read et al. |
| 7,993,105 B2 | 8/2011 | Weisse et al. |
| 8,205,476 B2 | 6/2012 | Voice |
| 8,256,118 B2 | 9/2012 | Cammer |
| 9,010,166 B2 | 4/2015 | Brennand |
| 9,121,287 B2 | 9/2015 | Weisse et al. |
| 9,221,120 B2 | 12/2015 | Schwarz et al. |
| 9,359,901 B2 | 6/2016 | Evans et al. |
| 9,556,742 B2 | 1/2017 | Parkin et al. |
| 9,657,577 B2 | 5/2017 | Weisse |
| 9,790,800 B2 | 10/2017 | Quigley |
| 10,443,612 B2 * | 10/2019 | Schwarz ................ F01D 5/18 |
| 2005/0044708 A1 * | 3/2005 | Lundgren ............. F01D 5/147 |
| | | 29/889.72 |
| 2011/0180587 A1 * | 7/2011 | Trapp .................. B23K 20/1265 |
| | | 228/2.1 |
| 2013/0039774 A1 | 2/2013 | Viens et al. |
| 2014/0241897 A1 | 8/2014 | Bales et al. |
| 2014/0271227 A1 | 9/2014 | Radomski et al. |
| 2015/0125308 A1 * | 5/2015 | Radomski ............. B23P 15/04 |
| | | 416/224 |
| 2015/0226068 A1 | 8/2015 | Maurizio |
| 2016/0265365 A1 * | 9/2016 | Crowston ............ F04D 29/023 |
| 2016/0305443 A1 | 10/2016 | Schwarz et al. |
| 2017/0023009 A1 | 1/2017 | Roche |
| 2018/0318966 A1 | 11/2018 | Evans et al. |
| 2019/0040744 A1 * | 2/2019 | Bales .................. B23K 1/0018 |
| 2019/0218915 A1 * | 7/2019 | Bales .................. B23K 20/023 |

FOREIGN PATENT DOCUMENTS

| | | |
|---|---|---|
| EP | 2727681 | 5/2014 |
| EP | 3153664 | 4/2017 |
| EP | 3441573 | 2/2019 |
| GB | 2073631 | 10/1981 |
| JP | S6326285 | 2/1988 |

* cited by examiner

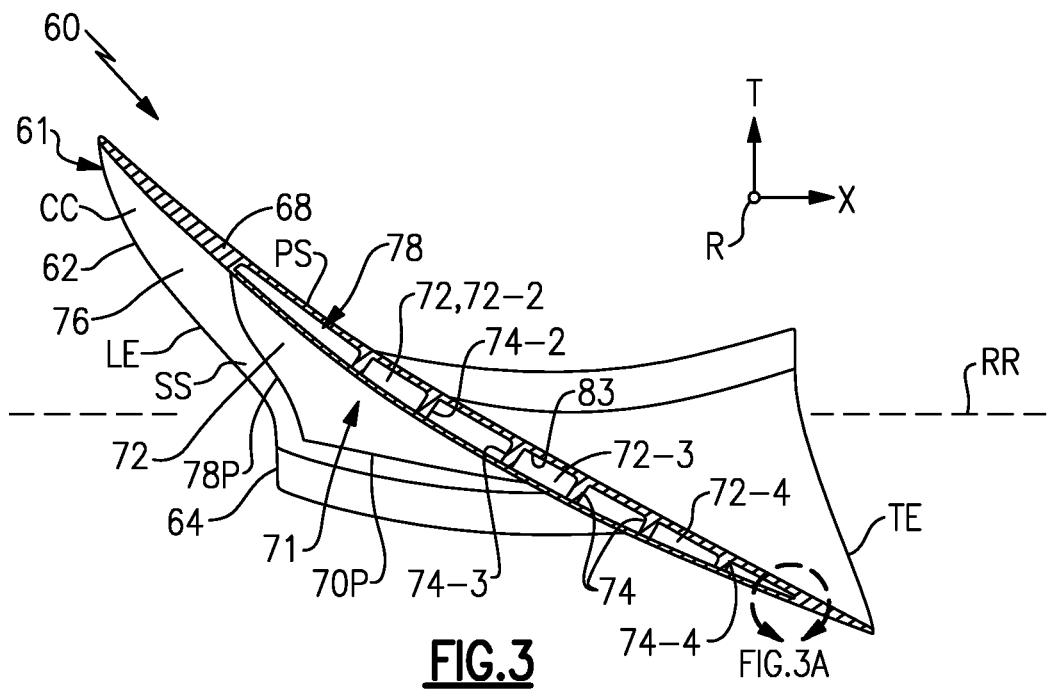
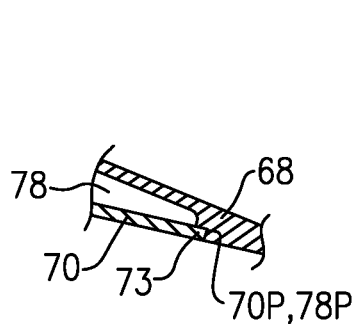
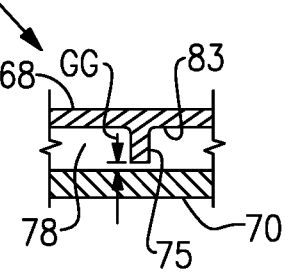
FIG.3
FIG.3A
FIG.3B

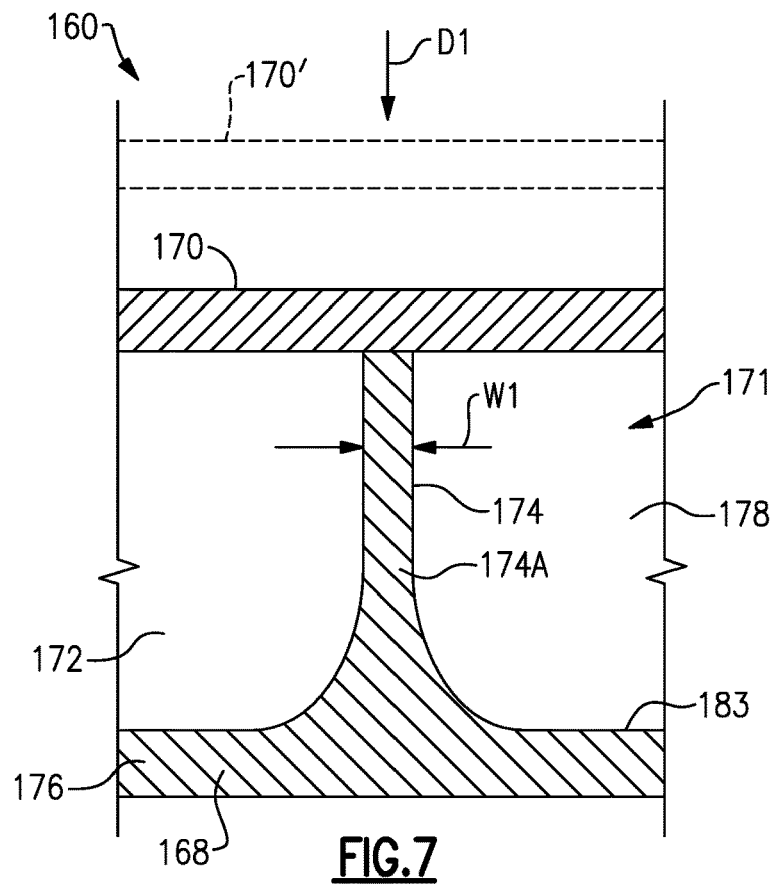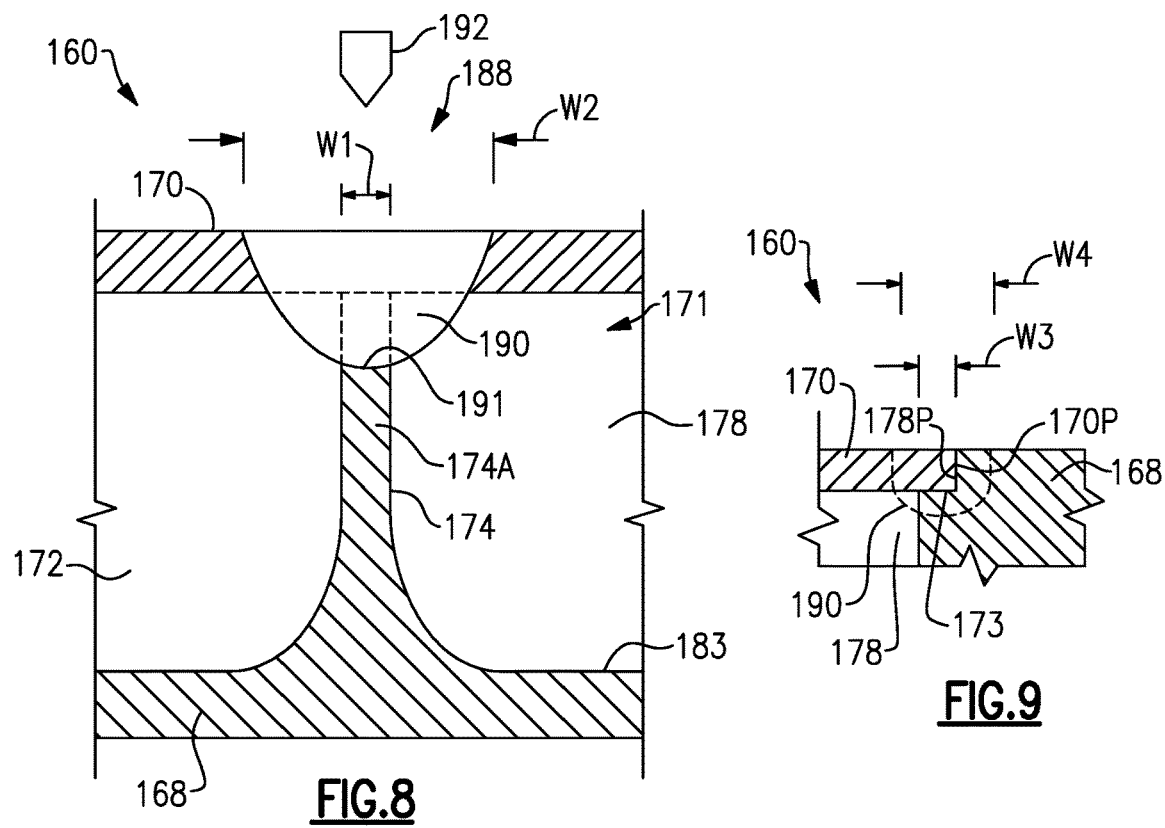

AIRFOIL WITH COVER FOR GAS TURBINE ENGINE

CROSS-REFERENCE TO RELATED APPLICATION

This application claims priority to U.S. Provisional Application No. 62/860,443 filed Jun. 12, 2019.

BACKGROUND

This disclosure relates to a gas turbine engine, and more particularly to forming gas turbine engine components such as hollow airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. Various techniques can be utilized to construct hollow fan blades, including attaching a cover to an airfoil body.

SUMMARY

An airfoil for a gas turbine engine according to an example of the present disclosure includes an airfoil body extending between leading and trailing edges in a chordwise direction and extending from a root section in a spanwise direction, and the airfoil body defining pressure and suction sides separated in a thickness direction. The airfoil body defines a recessed region extending inwardly from at least one of the pressure and suction sides, and the airfoil body includes at least one rib dimensioned to loop about a respective pocket within a perimeter of the recessed region. At least one cover skin is welded to the airfoil body along the at least one rib to enclose the recessed region. The at least one cover skin is welded to the at least one rib along a respective weld path. The weld path defines a weld width, the at least one rib defines a rib width, and a ratio of the weld width to the rib width is equal to or greater than 3:1 for each position along the weld path.

In a further embodiment of any of the foregoing embodiments, the ratio of the weld width to the rib width is equal to or less than 4:1 for each position along the weld path.

In a further embodiment of any of the foregoing embodiments, the at least one cover skin is welded to the airfoil body along the perimeter of the recessed region.

In a further embodiment of any of the foregoing embodiments, the at least one rib includes a serpentine profile including a plurality of branched sections extending from an elongated section.

In a further embodiment of any of the foregoing embodiments, the plurality of branched sections each have a major component extending in the chordwise direction from the elongated section towards the leading edge.

In a further embodiment of any of the foregoing embodiments, the at least one cover skin has a perimeter dimensioned to mate with the perimeter of the recessed region.

In a further embodiment of any of the foregoing embodiments, the at least one rib includes a plurality of ribs distributed along the recessed region, and the plurality of ribs are spaced apart from each other and from the perimeter of the recessed region.

In a further embodiment of any of the foregoing embodiments, the at least one rib includes a first rib. The first rib has a serpentine profile including a plurality of branched sections extending from an elongated section, and the plurality of branched sections each having a major component extending in the chordwise direction from the elongated section towards the leading edge.

In a further embodiment of any of the foregoing embodiments, the plurality of ribs includes a second rib and a third rib. The first rib is positioned between the first and second ribs.

In a further embodiment of any of the foregoing embodiments, a minimum distance between adjacent ribs of the plurality of ribs is equal to or greater than 0.5 inches, and is equal to or less than 2.0 inches, for at least a majority of positions along the weld path.

In a further embodiment of any of the foregoing embodiments, the at least one cover skin includes a plurality of cover skins, and the one or more ribs include a plurality of ribs. Each one of the plurality of ribs includes a raised protrusion extending outwardly from a pedestal portion. The pedestal portion is dimensioned to support an opposed pair of the plurality of cover skins, and the raised protrusion is dimensioned to extend between and space apart the opposed pair.

In a further embodiment of any of the foregoing embodiments, the airfoil is a fan blade.

A gas turbine engine according to an example of the present disclosure includes a fan section having a fan rotatable about an engine longitudinal axis, a compressor section, a turbine section that drives the compressor section and the fan, and a plurality of airfoils each including an airfoil body defining a recessed region extending inwardly from a sidewall of the airfoil body, and the sidewall including a plurality of ribs that divide the recessed region into a plurality of pockets. A cover skin is welded to the airfoil body along the plurality of ribs to enclose the recessed region. The cover skin is welded to the plurality of ribs along respective weld paths. The weld path defines a weld width, the plurality of ribs each define a respective rib width, and a ratio of the weld width to the rib width is between 3:1 and 4:1 for at least a majority of positions along the weld path.

In a further embodiment of any of the foregoing embodiments, each rib of the plurality of ribs is dimensioned to loop about a respective one of the plurality of pockets.

In a further embodiment of any of the foregoing embodiments, the plurality of ribs includes at least one rib having a serpentine profile and one or more ribs having an oblong profile.

A method of forming a gas turbine engine component according to an example of the present disclosure includes forming a recessed region in a sidewall of a main body, dividing the recessed region into a plurality of pockets surrounded by respective ribs of a plurality of ribs such that the plurality of pockets are surrounded by a perimeter of the recessed region, welding a cover to the main body to enclose the recessed region, including welding the cover to the plurality of ribs along respective weld paths. The weld path defines a weld width, the plurality of ribs each define a respective rib width, and a ratio of the weld width to the rib width is between 3:1 and 4:1 for each position along the weld path.

In a further embodiment of any of the foregoing embodiments, a perimeter of the cover is dimensioned to mate with the perimeter of the recessed region, and the welding step includes welding the cover to the perimeter of the recessed region.

In a further embodiment of any of the foregoing embodiments, the perimeter of the cover skin is welded to the perimeter of the recessed region in a first weld direction along a respective weld path, and each of the plurality of ribs is welded in a second weld direction along the respective weld path. The first direction is opposed to the second direction.

In a further embodiment of any of the foregoing embodiments, the cover includes a plurality of cover skins. Each one of the plurality of ribs includes a raised protrusion that extends outwardly from a pedestal portion. The pedestal portion is dimensioned to support an opposed pair of the plurality of cover skins. The raised protrusion is dimensioned to extend outwardly from external surfaces of the opposed pair subsequent to positioning the cover against the main body to enclose the recessed region, and the raised protrusion is at least partially consumed during the welding step.

In a further embodiment of any of the foregoing embodiments, an external surface contour of the main body and external surfaces of the cover skin cooperate to define a pressure side or a suction side of an airfoil.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates a section view of the component taken along line 3-3 of FIG. 2.

FIG. 3A illustrates selected portions of the component of FIG. 3.

FIG. 3B illustrates a sectional view of a stiffening rib within the component of FIG. 3.

FIG. 7 illustrates positioning a cover relative to a support rib according to an example.

FIG. 8 illustrates attaching the cover to the support rib of FIG. 7.

FIG. 9 illustrates attaching the cover to a shelf of the component of FIG. 7.

DETAILED DESCRIPTION

Figure 1:
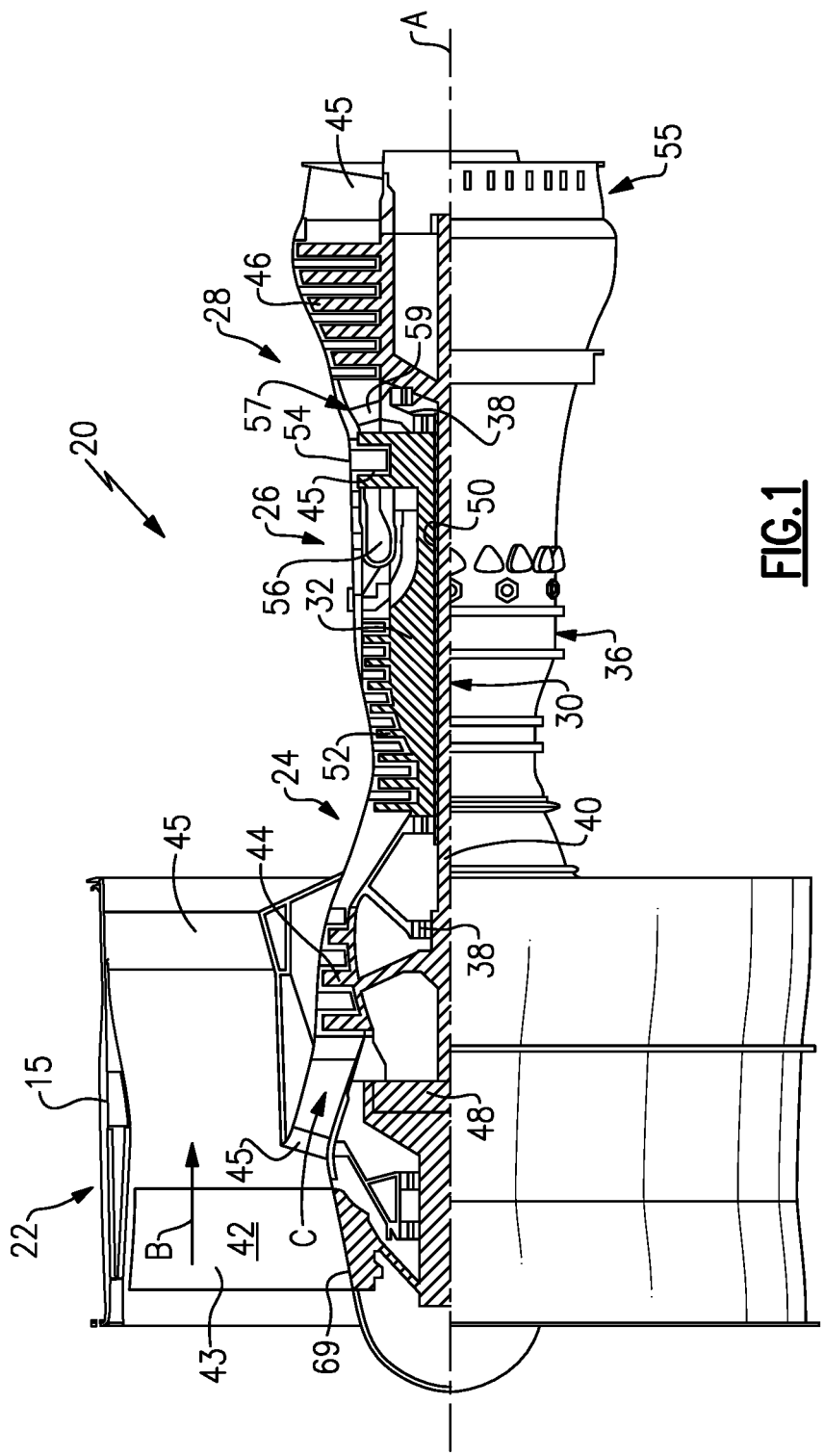
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
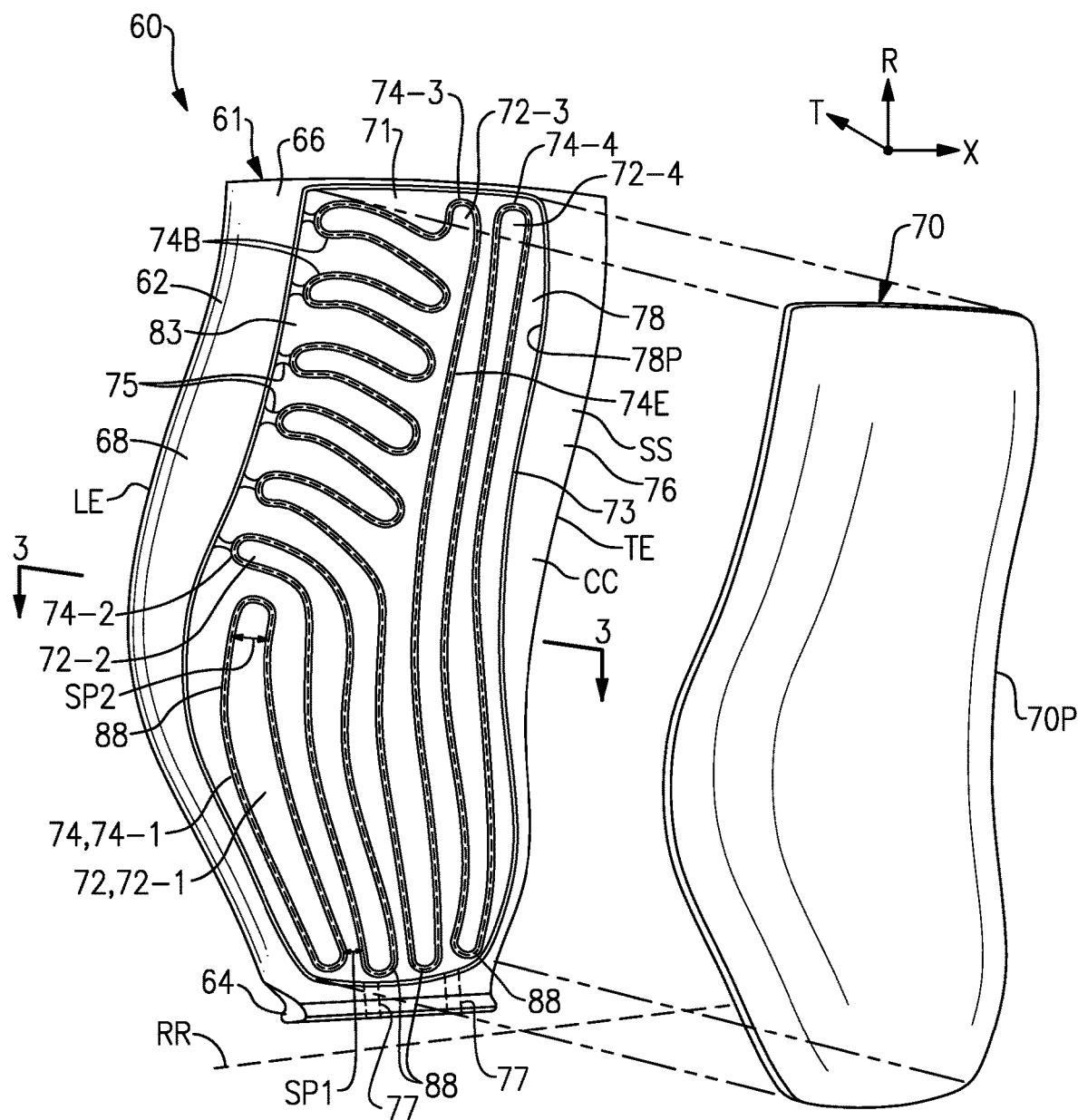
FIG. 2 illustrates a perspective view of a gas turbine engine component.

FIG. 2 illustrates a gas turbine engine component 60 according to an example. The component 60 can be incorporated in the gas turbine engine 20 of FIG. 1, for example. In the illustrated example of FIG. 2, the component 60 is an airfoil 61. The airfoil 61 can be a fan blade 42A for the fan 42 of FIG. 1, for example. Other types of airfoils, including blades, vanes and struts in the fan, compressor and turbine sections 22, 24, 28, mid-turbine frame 57 and turbine exhaust case (TEC) 55 (FIG. 1) may benefit from the examples disclosed herein which are not limited to the design shown. Other parts of the gas turbine engine 20 may benefit from the examples disclosed herein, including industrial turbines.

The airfoil 61 includes an airfoil section 62 extending in a spanwise or radial direction R from a root section 64. The root section 64 is a shape that is configured to mount the fan blade 42A in the engine 20, such as a dovetail shape. Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour CC of the airfoil section 62, as illustrated in FIG. 3. The airfoil 61 is rotatable about an axis of rotation RR. The axis of rotation RR can be collinear or parallel to the engine axis A (FIG. 1).

The airfoil section 62 includes an airfoil (or main) body 68 that extends in the radial direction R from the root section 64 to a tip portion 66. The tip portion 66 is a terminal end of the airfoil 61. The airfoil body 68 extends in a chordwise direction X between a leading edge LE and a trailing edge TE. The airfoil body 68 defines at least one of the pressure and suction sides PS, SS. In the illustrated example of FIGS. 2 and 3, the airfoil body 68 defines both the pressure and suction sides PS, SS.

The airfoil 61 includes a cover or cover skin 70 disposed on a surface of the airfoil body 68 and is arranged to provide a continuous surface with the suction side SS of the airfoil 61, as illustrated by FIG. 3. In another example, the cover skin 70 is disposed on the pressure side PS of the airfoil 61. The cover skin 70 is shown in an uninstalled position in FIG. 2 for illustrative purposes. The component 60 can include two or more cover skins 70 along each of the pressure and/or suction sides PS, SS of the airfoil section 62.

The airfoil body 68 and cover skin 70 can be made out of metallic materials such as titanium or aluminum. Other materials for the airfoil body 68 and cover skin 70 can be utilized, including metals or alloys and metal matrix composites.

A sidewall 76 of the main body 68 defines a recessed region 78 that is dimensioned to at least partially receive the cover skin 70. The recessed region 78 extends inwardly from at least one of the pressure and suction sides PS, SS defined by the sidewall 76, such as the suction side SS as illustrated in FIGS. 2-3. The main body 68 defines a shelf 73 along a perimeter 78P of the recessed region 78, as illustrated by FIG. 2. The shelf 73 is dimensioned to at least partially receive and mate with the perimeter P of the cover skin 70, as illustrated in FIG. 3A.

The sidewall 76 includes a rib pattern 71 having one or more support ribs 74 that divide the recessed region 78 into, or otherwise define, a plurality of internal cavities or pockets 72 within the perimeter 78P of the recessed region 78 along the airfoil section 62. In the illustrated example of FIG. 2, the sidewall 76 defines four separate and distinct pockets 72 (indicated at 72-1 to 72-4) bounded by the support ribs 74. The airfoil 61 can include fewer or more than four internal pockets 72, such as only one internal pocket 72. Each internal pocket 72 can be defined having different dimensions, shapes and at other orientations than illustrated in FIGS. 2 and 3. The internal pockets 72 can be substantially or completely free of any material such that the airfoil section 62 is hollow. The pockets 72 can serve to reduce an overall weight of the component 60. In other examples, the pockets 72 are at least partially filled with material, such as rubber-based damping material. The damping material can be inserted through one or more vent holes 77 (shown in dashed lines in FIG. 2 for illustrative purposes).

The support ribs 74 are dimensioned to abut against and support adjacent portions of the cover skin 70. In the illustrative example of FIG. 2, the airfoil body 68 includes four ribs 74 (indicated at 74-1 to 74-4) distributed along the recessed region 78 defined by the sidewall 76 of the airfoil body 68. Each rib 74-1 to 74-4 is dimensioned to substantially loop about and enclose a respective one of the internal pockets 72-1 to 72-4 within the perimeter 78P of the recessed region 78, and the support ribs 74 can be spaced apart from each other and from the perimeter 78P of the recessed region 78, as illustrated in FIG. 2. The substantially continuous, closed loop pockets 72 and ribs 74 can reduce stress concentrations in the component 60.

The ribs 74 can have various shapes or profiles. For example, ribs 74-1 and 74-4 have a generally elongated, oblong or racetrack shaped geometry or profile. Rib 74-2 has a generally L-shaped geometry or profile. Other geometries can include a complex profile. In the illustrative example of FIG. 2, rib 74-3 has a generally serpentine geometry or profile having two or more (e.g., twelve) undulations that greater than 90 degrees in alternating directions that define one or more branched sections 74B extending from an elongated section 74E. In the illustrative example of FIG. 2, the support rib 74-3 includes five branched segments 74B establishing the serpentine profile, with the branched sections 74B each having a major component extending in the chordwise direction X from the elongated section 74E towards the leading edge LE. It should be appreciated that the rib pattern 71 can include serpentine ribs 74 having fewer or more than five branched segments 74B, such as six or seven branched segments 74B. Serpentine rib 74-3 is positioned between and dimensioned to space apart ribs 74-1, 74-2 from rib 74-4. The component 60 can include fewer or more than four ribs 74, and the ribs 74 can be defined having different dimensions, shapes and at other orientations than illustrated in FIG. 2. For example, at least some of the ribs 74 can have a generally circular, elliptical, rectangular and triangular geometries. The support ribs 74 can be attached to the cover skin 70 utilizing any of the techniques disclosed herein, including laser or electron beam welding.

The rib pattern 71 can include a plurality of stiffening ribs 75 (FIG. 2) defined in the main body 68. The stiffening ribs 75 extend from the support ribs 74 and/or perimeter 78P of the recessed region 78. In the illustrative example of FIG. 2, the stiffening ribs 75 are generally linear or curvilinear and interconnect the support ribs 74 with the perimeter 78P of the recessed region 78. The stiffening ribs 75 are dimensioned to extend outwardly from a floor 83 of the recessed region 78, and at least some of the stiffening ribs 75 can be spaced apart from the cover skin 70 to define a gap GG when in an assembled position, as illustrated by rib 75 of FIG. 3B. The stiffening ribs 75 can serve to provide rigidity or stiffening to the main body 68, and can be dimensioned to allow the main body 68 to flex to absorb impacts from foreign objection debris (FOD), which can reduce strain along weld joints between the ribs 74 and cover skin 70. In other examples, the stiffening ribs 75 are omitted.

Figure 4:
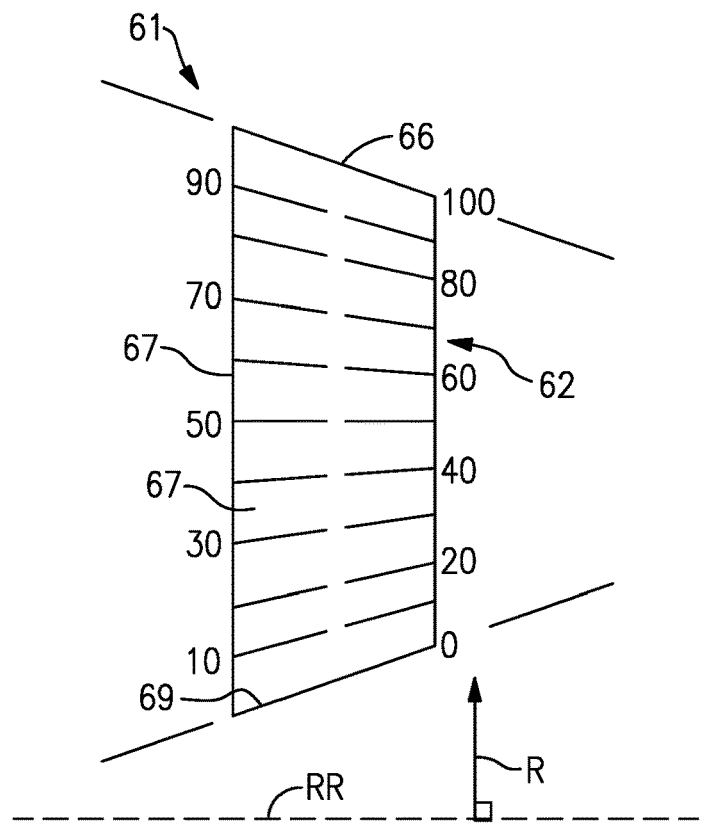
FIG. 4 is a schematic view of airfoil span positions.

Referring to FIG. 4, span positions of the airfoil section 62 are schematically illustrated from 0% to 100% in 10% increments to define a plurality of sections 67. Each section 67 at a given span position is provided by a conical cut that corresponds to the shape of segments a flow path (e.g., bypass flow path B or core flow path C of FIG. 1), as shown by the large dashed lines. In the case of an airfoil 61 such as with an integral platform 69, the 0% span position corresponds to the radially innermost location where the airfoil section 62 meets the fillet joining the airfoil 61 to the platform 69 (see also FIG. 1 illustrating platform 69). In the case of an airfoil 61 without an integral platform, the 0% span position corresponds to the radially innermost location where the discrete platform 69 meets the exterior surface of the airfoil section 62. A 100% span position corresponds to a section of the airfoil section 62 at the tip portion 66.

Figure 5:
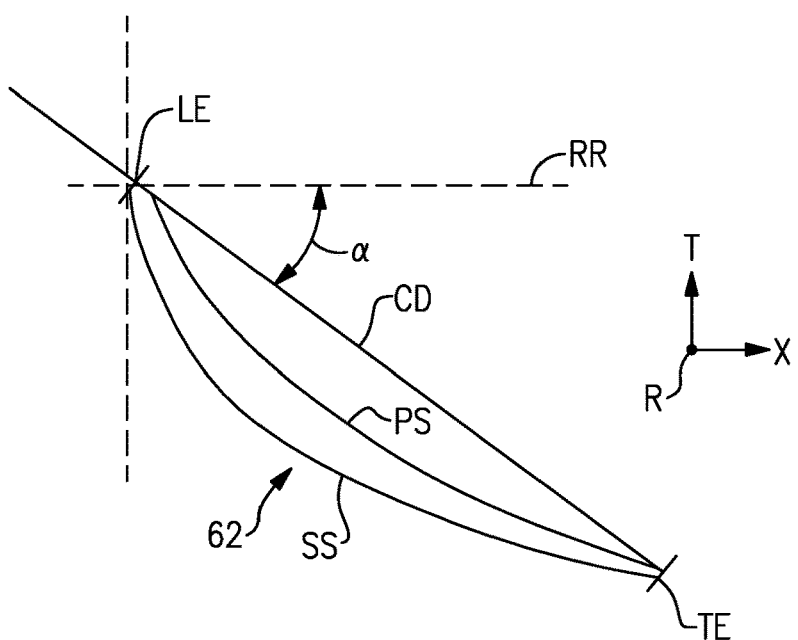
FIG. 5 is a schematic view of an airfoil depicting a stagger angle at a span position of FIG. 4.

Referring to FIG. 5 with continuing reference to FIG. 4, the airfoil section 62 is sectioned at a radial position between the root section 64 and tip portion 66. In examples, each airfoil section 62 is specifically twisted about a spanwise axis in the radial direction R with a corresponding stagger angle α at each span position. Chord CD, which is a length between the leading and trailing edges LE, TE, forms stagger angle α relative to the chordwise direction X or a plane parallel to the axis or rotation RR. The stagger angle α can vary along the span of the airfoil section 62 to define a twist. For example, the tip portion 66 can define a stagger angle α relative to the root section 64 that is greater than or equal to 5 degrees or 10 degrees, absolute. In some examples, the stagger angle α at the tip portion 66 relative to the root section 64 is between 5-60 degrees, absolute, or more narrowly between 10-30 degrees, absolute, such that the airfoil section 62 is twisted about a spanwise axis as illustrated by the airfoil 61 of FIGS. 2-3. The airfoil section 62 can be three-dimensionally twisted about the spanwise axis. In the illustrative example of FIG. 2, the rib pattern 71 and recessed region 78 extend inwardly of at least 5% span and extend outwardly of at least 95% span.

Figure 6:
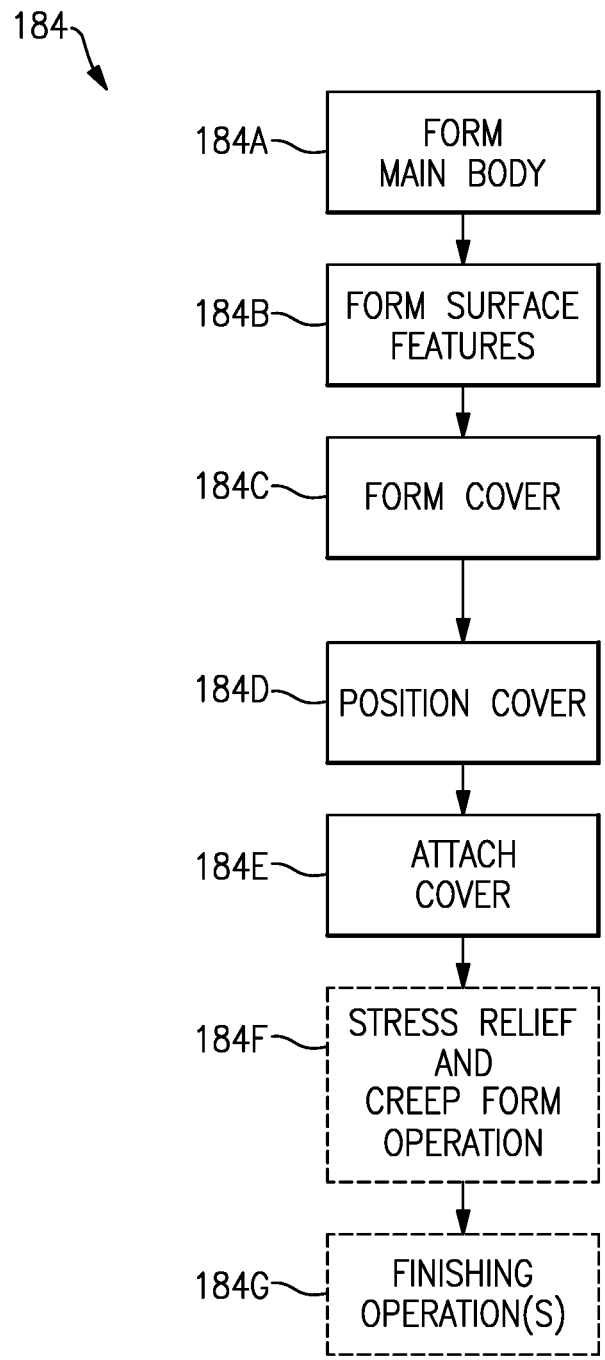
FIG. 6 illustrates a process for forming a gas turbine engine component.

FIG. 6 illustrates a process of constructing or forming a gas turbine engine component in a flow chart 184. The process can be utilized to form a hollow component such as the airfoil 61 of FIGS. 2-3, another component such as a solid airfoil, or another component of the engine 20 including static vanes and struts, for example. Reference is made to the component 60 of FIGS. 2-3 and component 160 of FIG. 7-9 for illustrative purposes. In this disclosure, like reference numerals designate like elements where appropriate and reference numerals with the addition of one-hundred or multiples thereof designate modified elements that are understood to incorporate the same features and benefits of the corresponding original elements.

Referring to FIGS. 6-7, a main body 168 of the component 160 can be prepared or otherwise formed at step 184A. The main body 168 can be formed with respect to a predefined geometry, which can be defined with respect to one or more design criterion. Step 184A can include mounting the main body 168 to a tool and machining internal and/or external surfaces of the main body 168 with respect to the predefined geometry, such as the aerodynamic external surface contour CC of the airfoil section 62 of FIGS. 2-3 characterized by a three-dimensional twist.

At step 184B, one or more surface features are formed or otherwise defined in the sidewall 176 of the main body 168. In the illustrated example of FIGS. 3-4, the surface features include the recessed region 78, shelf 73, pockets 72, and rib pattern 71 including support and stiffening ribs 74, 75 distributed along the sidewall 76 of the main body 68. The main body 68 and surfaces features can be forged, cast, machined or produced by additive manufacturing from a metal or metal alloy, for example.

At least one cover (or cover skin) 170 is formed at step 184C. The cover 170 can be forged, machined or produced by additive manufacturing from a metal or metal alloy, for example. In examples, the cover 170 is formed from a sheet metal body having a substantially planar geometry. For the purposes of this disclosure, the term "substantially" means±3 percent of the respective value unless otherwise stated.

Forming the cover 170 can include contouring, permanently reshaping or otherwise dimensioning the cover 170 according or with respect to an external surface contour or profile of the main body 168 of the component 160, such as the external surface contour CC of the airfoil section 62 of FIGS. 2-3. Various techniques can be utilized to contour the cover 170, including hot forming and machining. The cover 170 can be contoured with respect to a stagger angle of the respective airfoil that is twisted to define the predefined contour, including any of the stagger angles disclosed herein, as illustrated by airfoil 61 of FIGS. 2-3.

Forming the cover 170 occurs such that a perimeter 170P of the cover 170 is dimensioned to mate with the perimeter 178P of the recessed region 178, as illustrated in FIG. 9. In an installed position, the external surface contour of the main body 168 and external surfaces of the cover 170 can cooperate to define a pressure side or a suction side of an airfoil, as illustrated by the cover skin 70 of FIGS. 2 and 3.

At step 184D, the cover 170 is positioned relative to the main body 168 including moving cover skin 170' (shown in dashed lines for illustrative purposes) in direction D1 and into abutment with each adjacent rib 174 to enclose respective ones of the pockets 172. Each support rib 174 includes a neck portion 174A extending from a wall of the main body 168. The support rib 174 defines a width W1 and is dimensioned to abut against the cover 170, as illustrated in FIG. 7. In examples, the width W1 is approximately 0.05-0.075 inches, such as approximately 0.06 inches.

Referring to FIGS. 6 and 8, at step 184E surfaces of the cover 170 are mechanically attached to surfaces of the main body 168 along the respective rib 174 subsequent to positioning the cover 170 at step 184D. Various techniques can be utilized to mechanically attach the cover 170 to the main body 168, including any of the techniques disclosed herein. In the illustrative example of FIG. 8, the main body 168 can be mounted in a welding fixture. The cover 170 is positioned relative to the main body 168 and held against the main body 168 such that the ribs 174 directly abut against the cover skins 170 adjacent to respective weld paths or lines 188 (also shown in dashed lines in FIGS. 2 and 10 at 88 and 288 for illustrative purposes). The cover 170 is welded to the main body 168 along the respective ribs 174 with a welding system 192 to enclose the recessed region 178.

Welding the cover 170 to the rib 174 establishes a weldment 190 along the respective weld path 188. Opposed sides of the weldment 190 establish fillets that can slope inwardly from the cover 170. The weld path 188 defines a weld width W2 along an exposed surface of the component 160. Rib width W1 is defined across the respective rib 174 at a junction 191 between the weldment 190 and a remainder of the rib 174. In examples, a ratio W2:W1 of the weld width W2 to the rib width W1 is equal to or greater than 3:1 for each and every position, or at least a majority of positions, along the weld path 188. In examples, the ratio W2:W1 is equal to or less than 4:1 for each and every position, or at least a majority of positions, along the weld path 188. The ratio W2:W1 can be between 3:1 and 4:1 for each and every position, or at least a majority of positions, along the weld path 188 of each of the ribs 174. The disclosed quantities of W2:W1 can hold true for at least some or all of the ribs 174.

The ribs 174 can be dimensioned to establish a spacing relative to the weld paths 188. In the illustrative example of FIG. 2, weld paths 88 of adjacent ribs 74 establish a minimum distance SP1. Each weld path 88 defines a minimum distance SP2 between opposed positions along the weld path 88 of the respective rib 74. The weld paths 88 can be established such that the minimum distance SP1 and/or minimum distance SP2 is equal to or greater than 0.5 inches for each and every position, or at least a majority of positions, along the respective weld path 88, or more narrowly equal to or less than 2.0 inches for each and every position, or at least a majority of positions, along the respective weld path 88. For the purposes of this disclosure, the distances SP1, SP2 are defined with respect to a midline of the respective weld path 88. The relatively uniform weld spacing established by the distances SP1, SP2 disclosed herein can improve load distribution and ductility, and can reduce steady stresses in the component 60.

Referring to FIGS. 6 and 9, step 184E can include welding a perimeter 170P of the cover skin 170 to the shelf 173 defined by the main body 168 along a perimeter 178P of the recessed region 178. A ratio of the shelf width W3 of the shelf 173 to weld width W4 of weldment 190 (shown in dashed lines for illustrative purposes) can be between 2:3 and 2:5, such as approximately 1:2.

Figure 10:
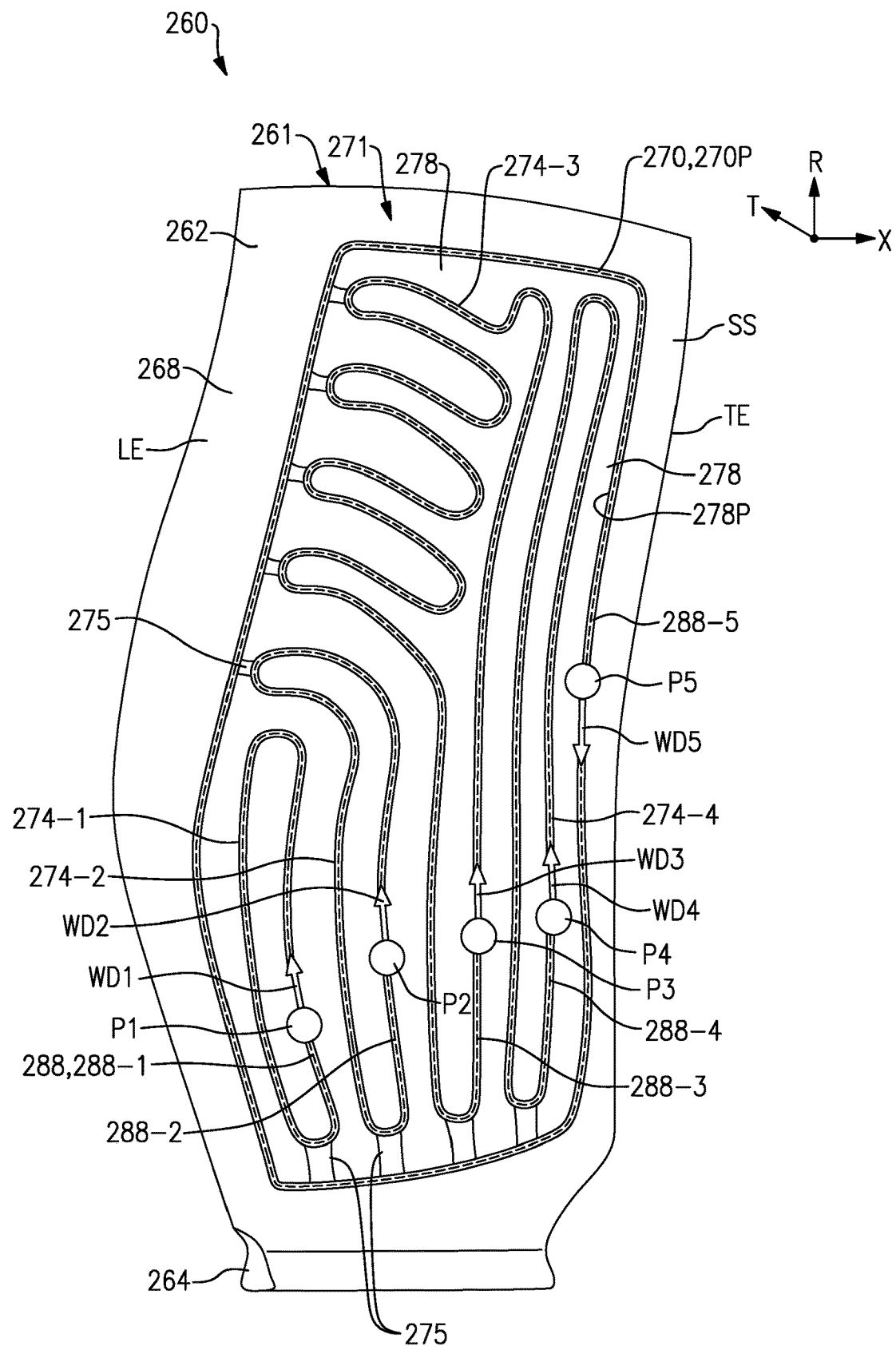
FIG. 10 illustrates exemplary weld paths of a gas turbine engine component.

Each weld path 188 can be established in various sequences and/or directions relative to the cover 170. FIG. 10 illustrates a component 260 including weld paths or lines 288 along respective support ribs 274 (indicated at 288-1 to 288-4 for ribs 274-1 to 274-4) of rib pattern 271 and cover 270 along a perimeter 278P of recessed region 278 (weld path 288 along the perimeter 270P of the cover 270 indicated at 288-5, with cover 270 shown in dashed lines for illustrative purposes). Each weld path 288-1 to 288-5 can be established relative to respective first through fifth weld directions WD1 to WD5 at respective start/stop positions P1 to P5. In the illustrative example of FIG. 10, weld directions WD1-WD4 are in a common direction (e.g., counter-clockwise) and weld direction WD5 is in a different, opposed direction (e.g., clockwise). In other examples, at least one of weld directions WD1-WD4 differ from each other, and/or weld direction WD5 is common with at least one of weld directions WD1-WD4. In examples, the cover 270 is welded to the main body 268 along the weld path 288-5, and the cover 270 is subsequently welded to the support ribs 274 along respective weld paths 288-1 to 288-4. In other examples, the cover 270 is welded to the support ribs 274 along respective weld paths 288-1 to 288-4 prior to being welded to the main body 268 along the weld path 288-5.

In examples, the support ribs 274 and cover 270 can be dimensioned such that a total weld path area (WPA) along a length of each of the weld paths 288-1 to 288-5 as measured at location 191 and relative to a total surface area (SA) of the cover 270 can be greater than 3%, such as between approximately 5% and 10%, or more narrowly approximately 6-9%. The ratio of WPA:SA disclosed herein can improve attachment between the cover 270 and the main body 268.

Referring back to FIGS. 6 and 8-9, a stress relief and creep form operation can be performed at step 184F to relieve stresses in the component 160 caused by welding the cover 170 and main body 168. Damping material can be inserted through a vent hole into the recessed region 178 subsequent to step 184F (see vent holes 77 of FIG. 2). One or more finishing operations can be performed at step 184G, including machining external surfaces of the component 160 according to a predefined surface contour.

Figure 11:
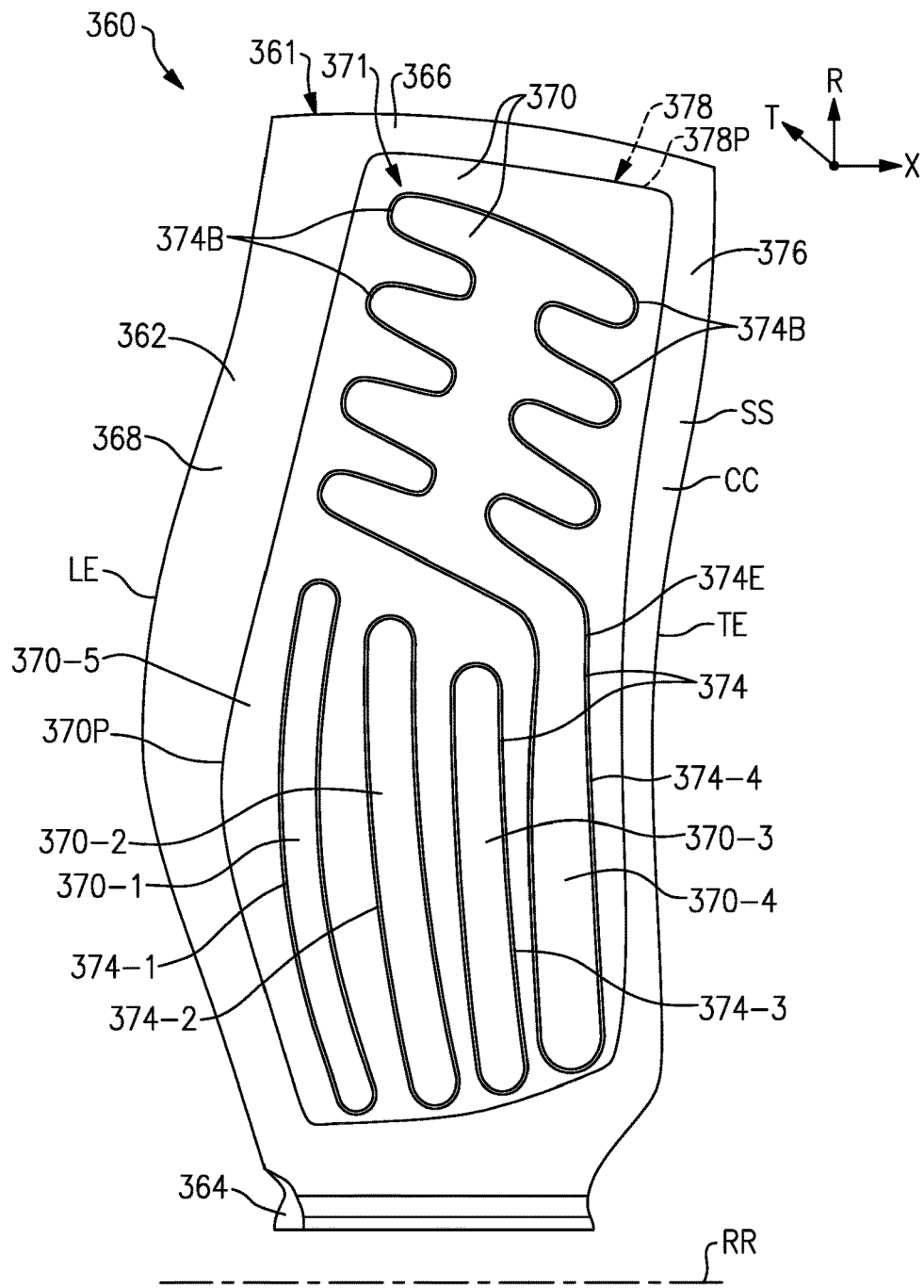
FIG. 11 illustrates a perspective view of a gas turbine engine component having a plurality of cover skins.
Figure 12:
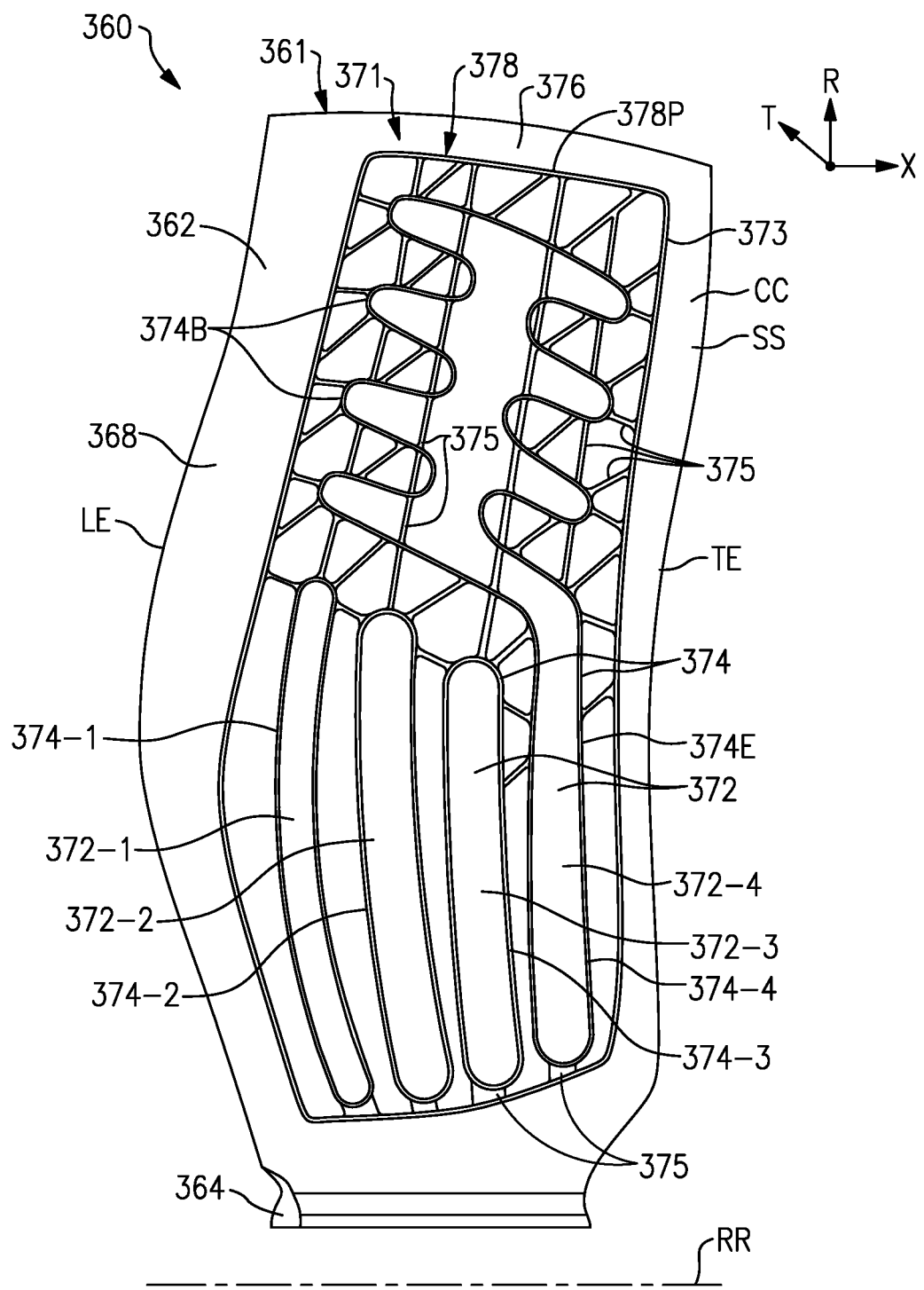
FIG. 12 illustrates the component of FIG. 11 with the cover skins removed.

FIGS. 11-12 illustrate a component 360 according to another example. In the illustrative example, the component 360 is an airfoil 361 including a plurality of separate and distinct cover skins 370 disposed along a main or airfoil body 368. The component 360 is shown with the cover skins 370 removed in FIG. 12 for illustrative purposes. The cover skins 370 cooperate with the airfoil body 368 to define an external surface contour CC of airfoil section 362 in an installed position. The cover skins 370 are arranged to provide a continuous surface with a suction side SS of the airfoil 361 when in an installed position, as illustrated by FIG. 11. In another example, the cover skins 370 are disposed on a pressure side PS of the airfoil 361 (see airfoil 61 of FIG. 3). The component 360 includes two or more cover skins 370 along the pressure and/or suction sides PS, SS of the airfoil section 362.

In the illustrative example of FIG. 11, the component 360 includes five cover skins 370 (indicated at 370-1 to 370-5) and a rib pattern 371 including four support ribs 374 (indicated at 374-1 to 374-4). The main body 368 defines a shelf 373 along the perimeter 378P of the recessed region 378, as illustrated by FIG. 12. Cover skin 370-5 serves as a peripheral cover skin having a perimeter 370P attached to the perimeter 378P of the recessed region 378. The shelf 373 is dimensioned to at least partially receive and mate with the perimeter 370P of the peripheral cover skin 370-5 along the perimeter 378P of the recessed region 378.

Cover skins 370-1 to 370-4 serve as localized cover skins that mate with respective one of the support ribs 374-1 to 374-4 to enclose respective pockets 372-1 to 372-4 (FIG. 12). It should be understood that the component 360 can include fewer or more than four localized cover skins 370 in accordance with the teachings disclosed herein, such as only one localized cover skin 370. A perimeter of each localized cover skin 370-1 to 370-4 is attached a respective support rib 374. Peripheral cover skin 370-5 is attached to each of the support ribs 374 to surround the localized cover skins 370-1 to 370-4 in an installed position.

The cover skins 370 are attached to the main body 368 to enclose the recessed region 378. The cover skins 370 can be attached to the main body 368 utilizing any of the techniques disclosed herein, including laser or electron beam welding, brazing, diffusion bonding or other fastening techniques.

Positioning the cover skins 370 can include situating one or more of the cover skins 370 over one or more stiffening ribs 375 of the rib pattern 371 (FIG. 12). At least some of the stiffening ribs 375 can be generally linear or curvilinear. Two or more of the stiffening ribs 375 can be substantially aligned in the chordwise X and/or radial directions R, as illustrated in FIG. 12.

The cover skins 370 and pockets 372 can have various geometries or profiles, including any of the geometries or profiles disclosed herein. Support rib 374-4 can have a generally serpentine geometry or profile including one or more (e.g., seven) branched sections 374B extending from an elongated section 374E. In the illustrative example of FIGS. 11-12, the branched sections 374B each have a major component extending in the chordwise direction X from the elongated section 374E towards the leading edge LE or the trailing edge TE.

Figure 11A:
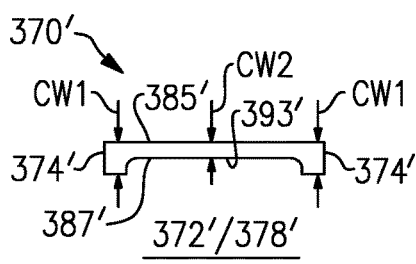
FIG. 11A illustrates a cover skin according to an example.

Method 184 can be utilized to construct or form the gas turbine engine component 360. Referring to FIG. 6, each of the cover skins 370 can be formed at step 184C utilizing any of the techniques disclosed herein. Referring to FIG. 11A, with continuing reference to FIG. 6, step 184C can include forming pedestal features containing one or more recesses within the internal surfaces of a thicker-than-normal cover skin 370. As illustrated in FIG. 11A, cover skin 370' includes external surfaces 385' and internal surfaces 387' opposed to the external surfaces 385'. The external surfaces 385' can define an external surface contour of the cover skin 370', and internal surfaces 387' can bound pocket 372' or another portion of recessed region 378'. The cover skin 370' can be chemically milled or otherwise machined to form a recess 393'. The cover skin 370' defines a first width CW1 along a perimeter of the cover skin 370' and defines a second width CW2 along the recess 393'. The recess 393' can have a radiused transition from first width CW1 to a second width CW2 such that first width CW1 is greater than second width CW2 at a valley of the recess 393'. Incorporation of a pedestal cover skin can reduce the stress concentration at the juncture of support rib 374 (shown in dashed lines in FIG. 11A for illustrative purposes) and cover skin 370', which can result in improved fatigue life.

Figure 13:
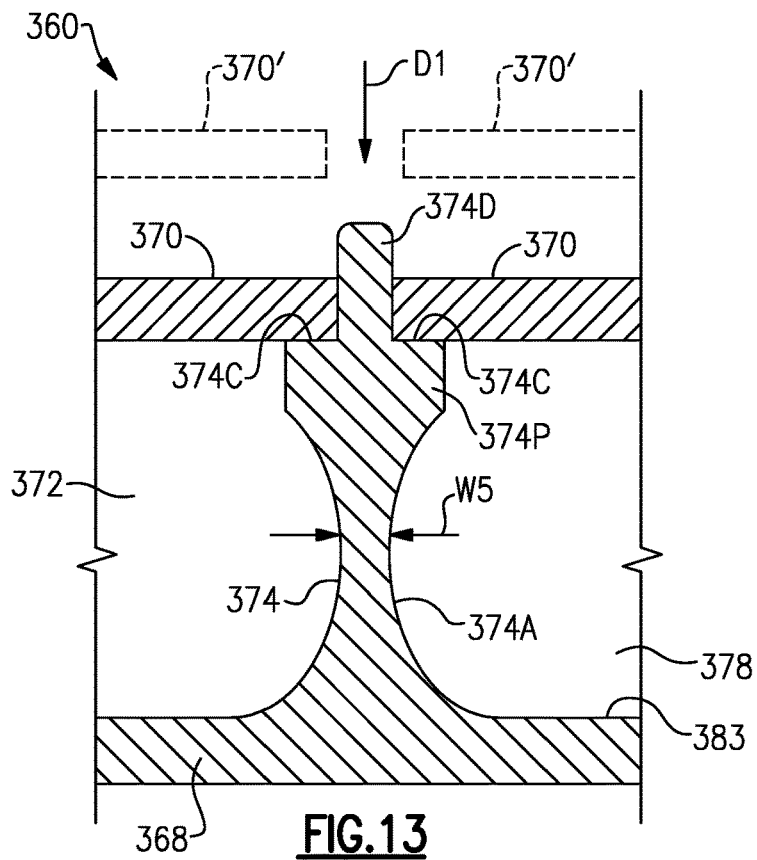
FIG. 13 illustrates adjacent cover skins positioned relative to a support rib of the component of FIG. 11.

Referring to FIG. 13, with continuing reference to FIG. 6, step 184D can including positioning the cover skins 370 relative to the main body 368 including moving cover skins 370' (shown in dashed lines for illustrative purposes) in direction D1 and into abutment with each adjacent rib 374 to enclose respective ones of the pockets 372.

Each support rib 374 can include a neck portion 374A extending from a wall of the main body 368 and a pedestal portion 374P. The pedestal portion 374P has a pair of shelves 374C that are dimensioned to support an opposed pair of the cover skins 370. In examples, the pedestal portion 374P has a width of about 0.06-0.09 inches. Each rib 374 can include a raised protrusion 374D extending outwardly from the pedestal portion 374P to define a terminal portion of the rib 374. The pedestal portion 374P can reduce stress concentrations at a junction between the rib 374 and the respective cover skin 370.

The raised protrusion 374D is dimensioned to extend between, and space apart the adjacent cover skins 370. The raised protrusion 374D can be dimensioned to abut against the cover skins 370 in an installed position. In examples, the raised protrusion 374D has a width of approximately 0.025 inches. In the illustrative example of FIG. 13, the raised protrusion 374D is integral with the pedestal portion 374P. In other examples, the raised protrusion 374D is a separate and distinct component mechanically attached to the pedestal portion 374P of the respective rib 374. In the illustrative example of FIG. 13, the raised protrusion 374D is dimensioned to extend outwardly of external surfaces of the adjacent cover skins 370 subsequent to positioning the cover skins 370 to cover the respective pockets 372.

Figure 14:
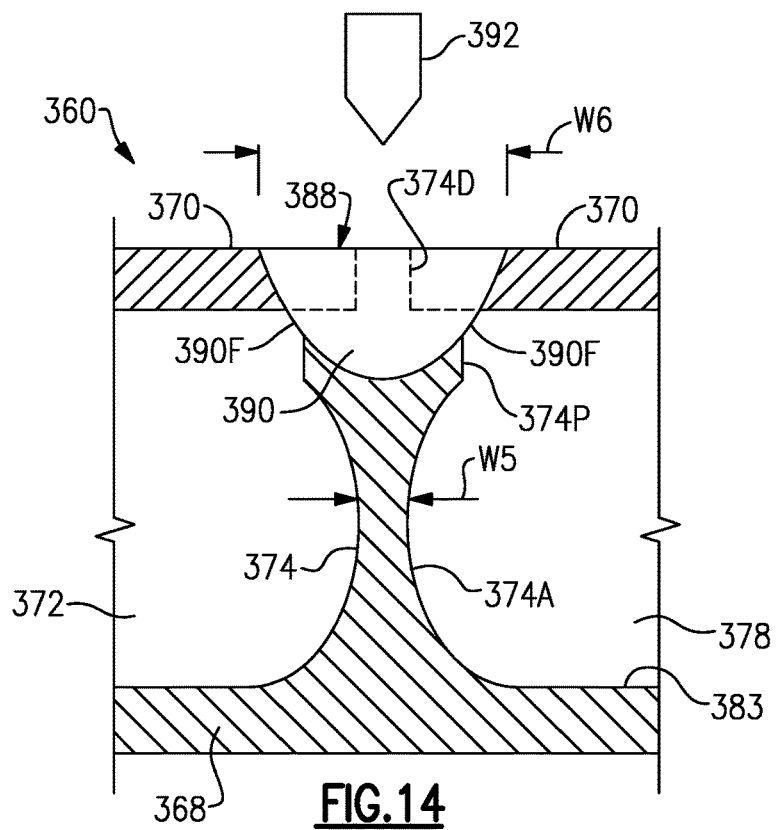
FIG. 14 illustrates adjacent cover skins attached to the support rib of FIG. 13.

Referring to FIGS. 6 and 14, at step 184E surfaces of each cover skin 370 are mechanically attached to surfaces of the main body 368 along the respective rib 374 subsequent to positioning the cover skins 370 at step 184D. Any of the techniques disclosed herein can be utilized to mechanically attach the cover skins 370 to the main body 368, including welding the cover skins 370 along a weld path 388 of the respective ribs 374 with a welding system 392. Welding the cover 370 to the rib 374 establishes a weldment 390 along the respective weld path 388.

The cover skins 370 can be welded to the main body 368 along each raised protrusion 374D, which is consumed during the welding such that the resulting weldment 390 is slightly below or substantially flush with the external surfaces of the adjacent cover skins 370. Respective edges of pedestal portion 374P, raised protrusion 374D, and cover skins 370 incorporated into the weldment 390 are shown in dashed lines in FIG. 14 for illustrative purposes. The raised protrusion 374D provides integral filler material to supplement weld metal drop-through that may occur during formation of internal fillets 390F on either side of the rib 374. Utilizing the raised protrusion 374D to provide filler material may serve to reduce a thickness of the adjacent cover skins 370, which may otherwise be a relative greater thickness for underfill. A reduction in thickness may reduce material utilization and cost in fabricating the component 360. The raised protrusion 374D can serve as a tracking feature during welding along the respective weld path 388, can reduce a depth of a surface depression in external surfaces of the component 360 adjacent the weldment 390, and can reduce a need for attaching the cover skins 370 to the ribs 374 or other portions of the main body 368 utilizing a blind weld technique.

The weld path 388 defines a weld width W6 along an exposed surface of the component 360. The consumed material of the raised protrusion 374D defines a portion of the weld width W6. Rib width W5 is defined as a minimum thickness across the respective rib 374 between the weldment 390 and the floor 383 of the recessed region 378. In examples, a ratio W6:W5 is equal to or greater than 3:1 for each and every position, or at least a majority of positions, along the weld path 388. In other examples, the ratio W6:W5 is equal to or less than 4:1 for each and every position, or at least a majority of positions, along the weld path 388. In further examples, the ratio W6:W5 can be between 3:1 and 4:1 for each and every position, or at least a majority of positions, along the weld path 388. The disclosed quantities of W6:W5 can hold true for at least some or all of the ribs 374. The ratios of weld width to rib width disclosed herein, including ratios W2:W1 and W6:W5 can reduce localized stress concentrations that may form during welding the cover along the weld paths.

Figure 15:
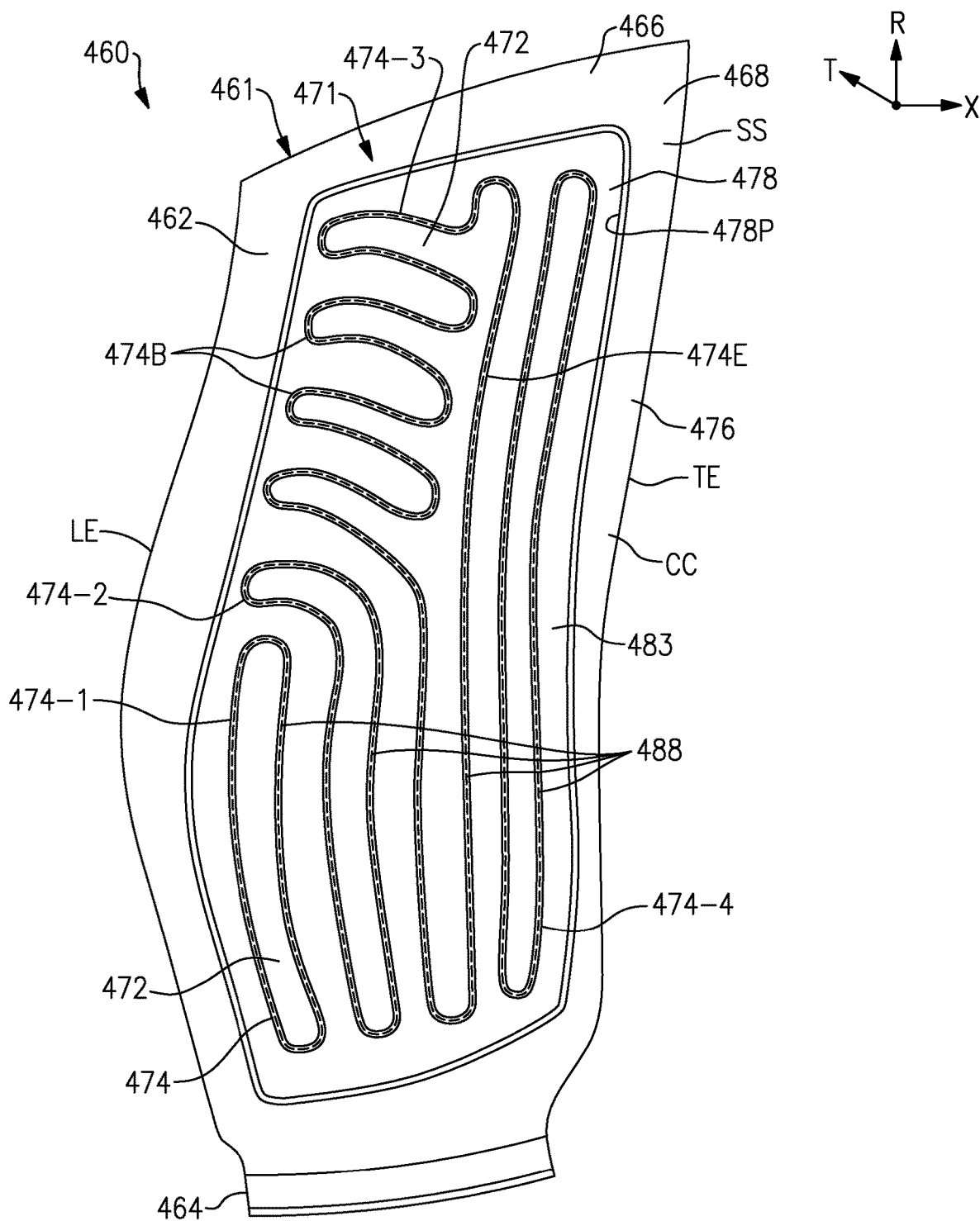
FIG. 15 illustrates a gas turbine engine component according to another example.

FIG. 15 illustrates a gas turbine engine component 460 according to another example, with a cover omitted for illustrative purposes. In the illustrative example of FIG. 15, the component 460 is an airfoil 461 including a rib pattern 471 having a plurality of support ribs 474 including at least one rib 474-3 having a serpentine geometry or profile. Rib 474-3 includes one or more branched sections 474B extending from an elongated section 474E, such as four branched segments 474B as illustrated in FIG. 15, to establish the serpentine profile.

Figure 16:
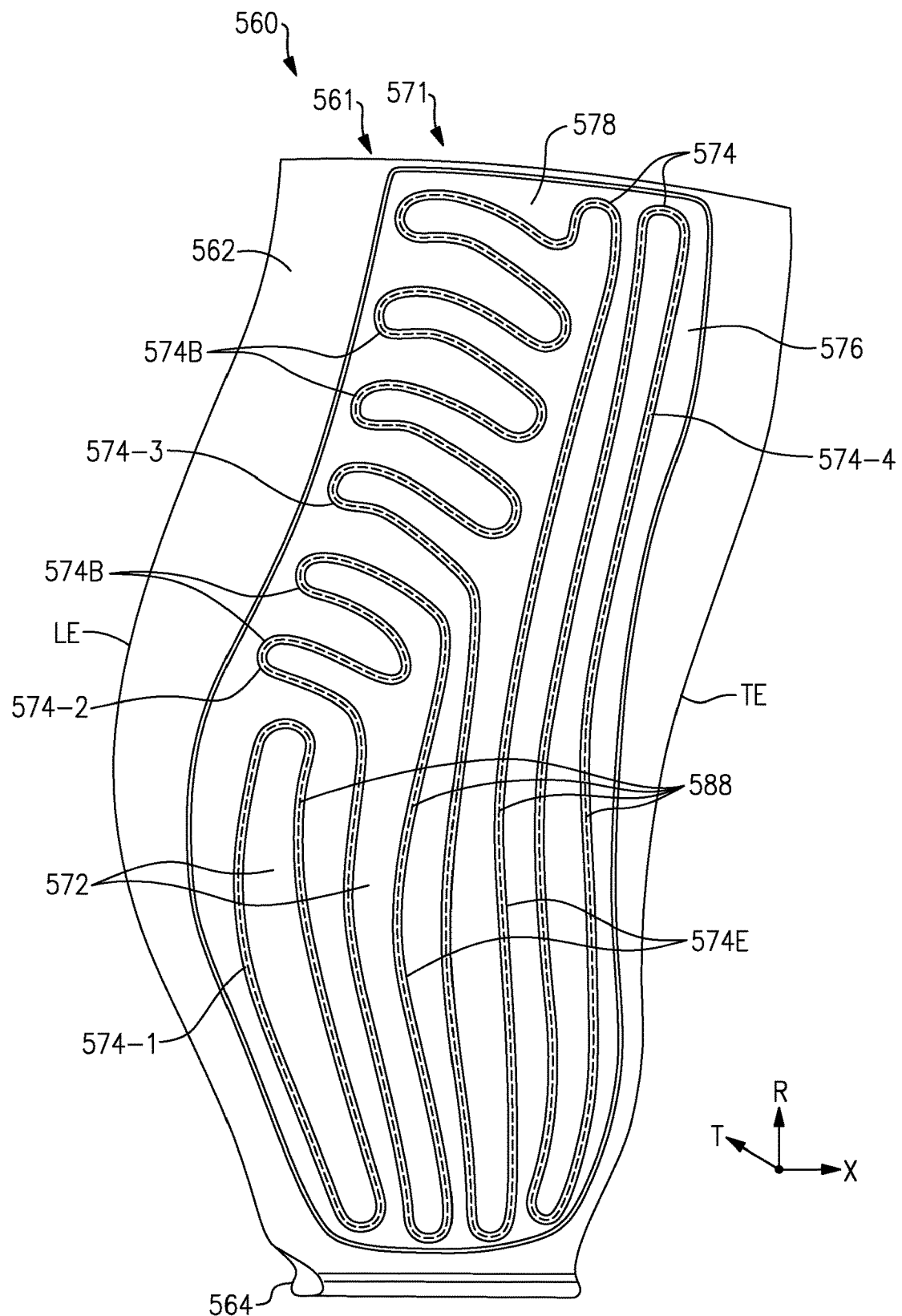
FIG. 16 illustrates a gas turbine engine component according to yet another example.

FIG. 16 illustrates a gas turbine engine component 560 according to yet another example, with a cover omitted for illustrative purposes. Component 560 includes a rib pattern 571 having a plurality of support ribs 574 including at least two rib 474-2, 474-3 having a generally serpentine geometry or profile. Each rib 574-2, 574-3 includes two or more branched sections 574B extending from an elongated section 574E to establish the serpentine profile.

The rib patterns 71/171/271/371/471/571 including the substantially continuous, closed loop ribs 74/174/274/374/474/574 and serpentine arrangements, and the substantially continuous, closed loop pockets 72/172/272/372/472/572 disclosed herein can reduce stress concentrations in the components 60/160/260/360/460/560, can minimize or otherwise reduce weld start/stop locations and associated defects such as weld porosity relative to non-serpentine arrangements. The spanwise and chordwise distribution of rib patterns 71/171/271/371/471/571 can improve vibratory stress levels in one or more bending/torsion modes, and may improve absorption and distribution of forces caused by bird strikes and other FOD impacts. The disclosed serpentine weld patterns can minimize or otherwise reduce component weld distortion, and can improve consistent post-weld component-to-component geometric variation and reproducibility.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil body extending between leading and trailing edges in a chordwise direction and extending from a root section in a spanwise direction, and the airfoil body defining pressure and suction sides separated in a thickness direction;
wherein the airfoil body defines a recessed region extending inwardly from at least one of the pressure and suction sides, the airfoil body includes a plurality of ribs distributed along the recessed region, and each of the ribs is dimensioned to loop about a respective pocket within a perimeter of the recessed region;
a plurality of cover skins welded to the airfoil body along a respective rib of the plurality of ribs to enclose the recessed region;
wherein each of the cover skins is welded to the respective rib along a respective weld path, the weld path defining a weld width, each of the ribs defining a rib width, and a ratio of the weld width to the rib width is equal to or greater than 3:1 for each position along the weld path.

2. The airfoil as recited in claim 1, wherein the ratio of the weld width to the rib width is equal to or less than 4:1 for each position along the weld path.

3. The airfoil as recited in claim 1, wherein the cover skins include a first cover skin welded to the airfoil body along the perimeter of the recessed region.

4. The airfoil as recited in claim 1, wherein one of the ribs includes a serpentine profile including a plurality of branched sections extending from an elongated section, and the plurality of branched sections each have a major component extending in the chordwise direction from the elongated section towards the leading edge.

5. The airfoil as recited in claim 1, wherein at least one of the cover skins has a perimeter dimensioned to mate with the perimeter of the recessed region, and the plurality of ribs are spaced apart from each other and from the perimeter of the recessed region.

6. The airfoil as recited in claim 5, wherein the plurality of ribs includes a first rib, the first rib having a serpentine profile including a plurality of branched sections extending from an elongated section, and the plurality of branched sections each having a major component extending in the chordwise direction from the elongated section towards the leading edge.

7. The airfoil as recited in claim 6, wherein the plurality of ribs includes a second rib and a third rib, the first rib positioned between the second rib and the third rib.

8. The airfoil as recited in claim 5, wherein a minimum distance between adjacent ribs of the plurality of ribs is equal to or greater than 0.5 inches, and is equal to or less than 2.0 inches, for at least a majority of positions along the weld path.

9. The airfoil as recited in claim 1, wherein:
each one of the plurality of ribs includes a raised protrusion extending outwardly from a pedestal portion, the pedestal portion is dimensioned to support an opposed pair of the plurality of cover skins, and the raised protrusion is dimensioned to extend between and space apart the opposed pair.

10. The airfoil as recited in claim 1, wherein the airfoil is a fan blade.

11. The airfoil as recited in claim 1, wherein:
the plurality of cover skins includes a first cover skin and a second cover skin;
the plurality of ribs includes a first rib, the first rib is dimensioned to loop about the respective pocket such that a perimeter of the first rib has a serpentine profile;
the perimeter of the first rib includes a plurality of branched sections extending from an elongated section, and the plurality of branched sections each have a major component extending in the chordwise direction from the elongated section towards the leading edge;
the first cover skin includes a perimeter having a serpentine profile such that the perimeter of the first cover skin is dimensioned to follow the perimeter of the first rib along the branched sections and the elongated section, and such that the respective weld path loops about the respective pocket enclosed by the first cover skin; and
each one of the plurality of ribs includes a raised protrusion extending outwardly from a pedestal portion, the pedestal portion is dimensioned to support an opposed pair of the plurality of cover skins, and the raised protrusion is dimensioned to extend between and space apart the opposed pair of the plurality of cover skins.

12. The airfoil as recited in claim 11, wherein:
the plurality of ribs are spaced apart from each other and from the perimeter of the recessed region;
a perimeter of the second cover skin is dimensioned to mate with the perimeter of the recessed region such that the perimeter of the second cover skin encircles the perimeter of the first cover skin; and
the ratio of the weld width to the rib width is equal to or less than 4:1 for each position along the weld path.

13. A gas turbine engine comprising:
a fan section including a fan rotatable about an engine longitudinal axis;
a compressor section;
a turbine section that drives the compressor section and the fan; and
a plurality of airfoils each comprising:
an airfoil body defining a recessed region extending inwardly from a sidewall of the airfoil body, and the sidewall including a plurality of ribs that divide the recessed region into a plurality of pockets;
a cover including a plurality of cover skins welded to the airfoil body along a respective one of the plurality of ribs to enclose the recessed region; and
wherein the cover skins are welded to the plurality of ribs along respective weld paths, the weld path defining a weld width, the plurality of ribs each defining a respective rib width, and a ratio of the weld width to the rib width is between 3:1 and 4:1 for at least a majority of positions along the weld path.

14. The gas turbine engine as recited in claim 13, wherein each rib of the plurality of ribs is dimensioned to loop about a respective one of the plurality of pockets.

15. The gas turbine engine as recited in claim 14, wherein the plurality of ribs includes at least one rib having a serpentine profile and one or more ribs having an oblong profile.

16. A method of forming a gas turbine engine component comprising:
forming a recessed region in a sidewall of a main body;
dividing the recessed region into a plurality of pockets surrounded by respective ribs of a plurality of ribs such that the plurality of pockets are surrounded by a perimeter of the recessed region;
welding a cover including a plurality of cover skins to the main body to enclose the recessed region, including welding the cover skins to respective ribs of the plurality of ribs along respective weld paths; and
wherein the weld path defines a weld width, the plurality of ribs each define a respective rib width, and a ratio of the weld width to the rib width is between 3:1 and 4:1 for each position along the weld path.

17. The method as recited in claim 16, wherein the plurality of cover skins includes a first cover skin, a perimeter of the first cover skin is dimensioned to mate with the perimeter of the recessed region, and the welding step includes welding the first cover skin to the perimeter of the recessed region.

18. The method as recited in claim 17, wherein the perimeter of the first cover skin is welded to the perimeter of the recessed region in a first weld direction along a respective weld path, and each of the plurality of ribs is welded in a second weld direction along the respective weld path, the first direction opposed to the second direction.

19. The method as recited in claim 16, wherein:
each one of the plurality of ribs includes a raised protrusion that extends outwardly from a pedestal portion, the pedestal portion dimensioned to support an opposed pair of the plurality of cover skins, the raised protrusion is dimensioned to extend outwardly from external surfaces of the opposed pair subsequent to positioning the cover skins against the main body to enclose the recessed region, and the raised protrusion is at least partially consumed during the welding step.

20. The method as recited in claim 16, wherein an external surface contour of the main body and external surfaces of the cover skins cooperate to define a pressure side or a suction side of an airfoil.

* * * * *